United States Patent
Sakamoto

(10) Patent No.: US 6,543,859 B2
(45) Date of Patent: Apr. 8, 2003

(54) ELECTRIC CONTROL APPARATUS FOR BRAKE

(75) Inventor: Tadashige Sakamoto, Yokosuka (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 10/085,777

(22) Filed: Feb. 27, 2002

(65) Prior Publication Data

US 2002/0125764 A1 Sep. 12, 2002

(30) Foreign Application Priority Data

Mar. 7, 2001 (JP) ........................................ 2001-062735

(51) Int. Cl.[7] ................................................ B60T 8/34
(52) U.S. Cl. .................................. 303/113.2; 303/116.2
(58) Field of Search ........................... 303/113.1–113.5, 303/116.1, 116.2, 139, 140

(56) References Cited

U.S. PATENT DOCUMENTS 6,290,310 B1 * 9/2001 Kusano .................. 303/122.11
6,293,633 B1 * 9/2001 Hara et al. ................ 303/113.2
6,412,882 B1 * 7/2002 Isono et al. ............... 303/114.1

FOREIGN PATENT DOCUMENTS

| JP | 04243655 A | 8/1992 | ........... B60T/13/66 |
| JP | 10147224 A | 6/1998 | ............. B60T/8/00 |
| JP | 11341604 A | 12/1999 | ............. B60L/7/24 |

* cited by examiner

*Primary Examiner*—Christopher P. Schwartz
(74) *Attorney, Agent, or Firm*—Fish & Richardson PC

(57) ABSTRACT

An electric control apparatus of a brake is provided with a second reservoir, in which a brake fluid is stored in advance, separately from a control device of a brake hydraulic pressure. The second reservoir communicates with a pump, which is an original component of the control device, on the side of a suction opening of the pump through a second liquid passage equipped with a first on-off valve. A first liquid passage is equipped with a second on-off valve. The pump is operated with the first on-off valve being opened to supply a brake hydraulic pressure corresponding to the quantity of an operation of a brake pedal in a sate in which the second on-off valve is closed to a wheel cylinder as an electric control mode of a brake hydraulic pressure of an electronic control unit.

5 Claims, 2 Drawing Sheets

ELECTRIC CONTROL APPARATUS FOR BRAKE

BACKGROUND OF THE INVENTION

1. Field of the Invention

The present invention relates to an electric control apparatus of a brake for controlling a brake hydraulic pressure of a vehicle (i.e. an automobile and a motorcycle), and more particularly to an electric control apparatus of a brake provided with both of an electric control system of a brake hydraulic pressure for controlling the brake hydraulic pressure electrically by means of an external hydraulic pressure source other than a master cylinder of the vehicle correspondingly to a quantity of an operation of the brake pedal of the vehicle and a mechanical control system of the brake hydraulic pressure as a fail-safe function for controlling the brake hydraulic pressure mechanically by means of the master cylinder independently from the electric control system.

2. Description of the Related Art

As conventional electric control apparatuses of a brake provided with both an electric control system of a brake hydraulic pressure and a mechanical control system of the brake hydraulic pressure as the fail-safe function of the electric control system, severally, the electric control apparatuses disclosed in Japanese Patent Publication No. 3,024,225, Japanese Laid-Open Patent Publication No. Hei. 10-147,224 and Japanese Laid-Open Patent Publication No. Hei. 11-341,604 can be cited.

Any of these conventional electric control apparatuses has an external hydraulic pressure supplying source including an accumulator storing a high hydraulic pressure as an essential component for the electric control system besides a master cylinder of the vehicle.

Because the conventional electric control apparatuses have the external hydraulic pressure supplying source including the accumulator as an essential component as described above, the conventional electric control apparatuses have the problems such that the configurations of the electric control system become complex and the numbers of the parts of the electric control apparatuses increase to make the increases of the costs of their production inevitable.

SUMMARY OF THE INVENTION

An object of the present invention is to provide an electric control apparatus of a brake simple in configuration and capable of constructing its electric control system of a brake hydraulic pressure without increasing the number of the parts thereof so much.

For the achievement of the foregoing object, an electric control apparatus of a brake according to a first aspect of the present invention comprises: a master cylinder for generating a brake hydraulic pressure according to an operation of a brake pedal; a first liquid passage for supplying the brake hydraulic pressure to a wheel cylinder by making the master cylinder and the wheel cylinder communicate with each other; a control device of the brake hydraulic pressure provided at a part of the first liquid passage, the control device including a control valve, a pump and a first reservoir containing a brake fluid as main components, the control device increasing and decreasing the brake hydraulic pressure to be supplied to the wheel cylinder by controlling operations of the components; detection means of a quantity of the operation of the brake pedal for detecting a physical quantity corresponding to the operation of the brake pedal; a second reservoir provided separately from the control device, the second reservoir storing the brake fluid in advance; a second liquid passage making the second reservoir communicate with the pump, constituting the control device, on a side of a suction opening of the pump, the second liquid passage being provided with a first on-off valve; a second on-off valve provided at a position in the first liquid passage, the position being nearer to the master cylinder than a position of the control device; and an electronic control unit for outputting a command signal for operating the control device, the electronic control unit including an electric control mode of the brake hydraulic pressure as an operation in a normal state of the unit and a mechanical control mode of the brake hydraulic pressure as an operation in an abnormal state in execution of the electric control mode, the electric control mode being for operating the pump with the first on-off valve being opened in order to supply a brake hydraulic pressure to the wheel cylinder, the brake hydraulic pressure being corresponding to a detection signal of the detection means in a state such that the second on-off valve is closed, the mechanical control mode being for supplying a brake hydraulic pressure to the wheel cylinder directly, the brake hydraulic pressure corresponding to the quantity of the operation of the brake pedal in a state such that the second on-off valve is opened after turning off components concerning the execution of the electric control mode.

According to the present aspect of the invention, an electric brake control system of a brake hydraulic pressure can be constructed that has a simple configuration and a not so much increased number of parts without the necessity of an external hydraulic pressure supplying source with an accumulator as an essential component.

That is, the aspect has the following features. The second reservoir, in which the brake fluid is previously stored, is provided separately from the control device. The second reservoir communicates with the pump on the side of the suction opening thereof, the pump being an original component of the control device, through the second liquid passage equipped with the first on-off valve. The second on-off valve is provided at a position in the first liquid passage, the position being nearer to the master cylinder than the position of the control device. Consequently, by such a configuration, in the electric control mode of the electric control unit, the pump operates with the first on-off valve being opened in order to supply a brake hydraulic pressure to the wheel cylinder. The brake hydraulic pressure corresponds to a detection signal of the detection means in the state such that the second on-off valve is closed. Therefore, because the present aspect is newly provided with only the second reservoir and uses the existing pump also as means for generating the brake hydraulic pressure in the electric control mode, the electric control system of a brake hydraulic pressure can be configured without increasing the number of the parts thereof so much, and with a simple configuration.

When an abnormality is generated in execution of the electric control mode, the electronic control unit of the aspect turns off the components concerning the execution of the electric control mode, namely the unit shifts to the mechanical control mode for supplying a brake hydraulic pressure, which corresponds to the quantity of an operation of the brake pedal in the state such that the second on-off valve is opened, to the wheel cylinder directly in place of the execution of the electric control mode. Thereby, the aspect can easily realize a fail-safe function.

Moreover, a second aspect of the present invention is an electric control apparatus of a brake according to the first aspect, wherein the second reservoir communicates with a part in the first liquid passage between the second on-off valve and the control device through a pressure relief valve by a third liquid passage.

According to the present aspect, if the brake hydraulic pressure generated by the pump becomes excessively high during the execution of the electric control mode, the aspect opens the pressure relief valve to return the brake fluid to the second reservoir through the third liquid passage automatically. Consequently, the safety of the aspect is further improved.

Moreover, a third aspect of the present invention is an electric control apparatus of a brake according to the first or the second aspect, the apparatus further comprising a brake simulator communicating with the master cylinder through a fourth liquid passage with a third on-off valve, wherein the electronic control unit is set to keep the third on-off valve in an opened state thereof when the unit shifts to the mechanical control mode in the case where an abnormality is generated in execution of the electric control mode after a beginning of an operation of the brake pedal in the electric control mode.

Because the master cylinder is provided with the brake simulator communicating with the master cylinder through the fourth liquid passage equipped with the third on-off valve in the present aspect, a driver does not feel unfitted feeling when the driver depresses the brake pedal. Furthermore, because the electronic control unit is set to keep the third on-off valve in the opened state thereof when the unit shifts to the mechanical control mode in the case where an abnormality is generated in the execution of the electric control mode after an operation of the brake pedal has begun in the electric control mode, the brake fluid fed to the brake simulator can effectively be utilized for execution of the mechanical control mode in place of the electric control mode. That is, the brake simulator can work also as an accumulator, which makes the electric control apparatus more effective.

Moreover, a fourth aspect of the present invention is an electric control apparatus of a brake according to any one of the first to the third aspects, the apparatus further comprising a brake light signal outputting part provided in the brake pedal, the brake light signal outputting part being connected with the electronic control unit to transmit a brake light signal to the unit when the brake pedal is operated, wherein the unit executes the electric control mode after confirming that the brake pedal has normally operated by the transmission of the brake light signal.

According to the present aspect, because the electronic control unit executes the electric control mode after the confirmation of the normal operation of the brake pedal by the transmission of the brake light signal, namely when the driver has normally depressed the brake pedal for braking, the aspect can correctly generate a braking force correspondingly to the brake operation of the driver. Consequently, the aspect can decrease the possibility of an erroneous action owing to the careless execution of the electronic control mode.

Incidentally, in the case where the electric control apparatus of a brake has an automatic braking mode for automatically braking a vehicle on a command signal from the electronic control unit even if the driver does not operate the bake with the brake pedal, the construction for the execution of the electric control mode based on the brake light signal is not applied to the electric control apparatus.

Moreover, a fifth aspect of the present invention is an electric control apparatus of a brake according to any one of the first to the third aspects, the apparatus further comprising a brake light signal outputting part provided on the brake pedal, the brake light signal outputting part being connected with the electronic control unit to transmit a brake light signal to the unit when the brake pedal is operated, wherein the detection means is connected with the electronic control unit to transmit the detection signal of said detection means to the electronic control unit when the brake pedal is operated, and the electronic control unit executes the mechanical control mode when either of both the signals is abnormal.

Thereby, the fail-safe function can further effectively be utilized.

Moreover, a sixth aspect of the present invention is an electric control apparatus of a brake according to any one of the first to the fifth aspect, wherein the control device includes an anti-lock braking system (ABS) function and a traction control system (ASR) function.

According to the present aspect, the electric control mode can be constructed by using the pump that is necessarily equipped by an existing control device of a brake hydraulic pressure having the ABS function and the ASR function. Moreover, the ABS function and the ASR function can be played as they are.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Next, preferred embodiments of the present invention are described on the attached drawings.

Figure 1:
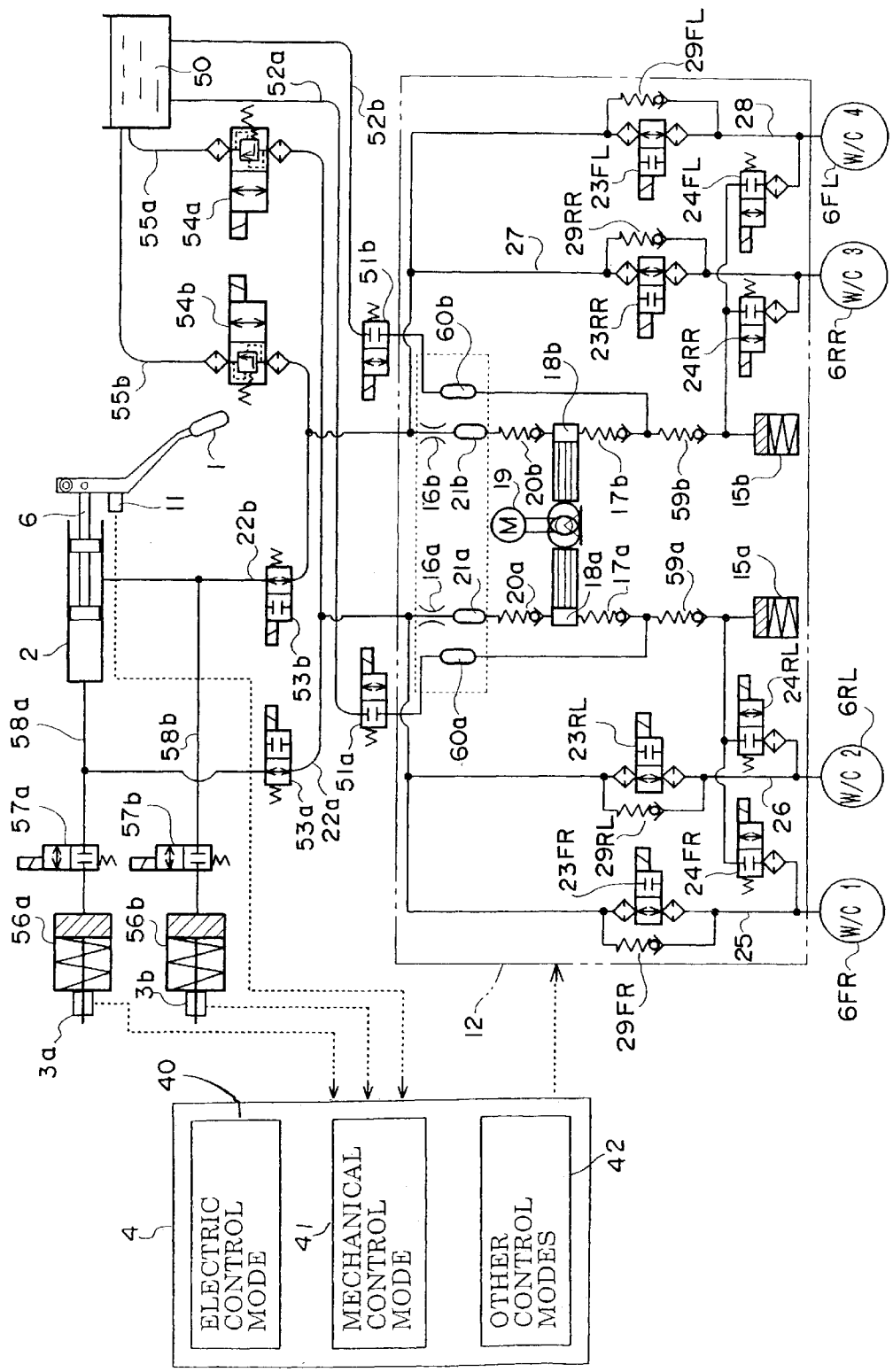
FIG. 1 is a schematic diagram showing the configuration of an electric control apparatus of a brake provided with the ABS function and the ASR function according to an embodiment of the present invention as an example of being applied to a four-wheel electric automobile.

FIG. 1 is the schematic diagram showing the configuration of the electric control apparatus of a brake provided with the ABS function and the ASR function according to an embodiment of the present invention. In the embodiment, the vehicle in which the electric control apparatus is installed is a four-wheel electric automobile.

As shown in FIG. 1, the electric control apparatus according to the present embodiment includes a master cylinder 2 for generating a brake hydraulic pressure according to an operation of a brake pedal 1, two first liquid passages (i.e. oil pressure paths) 22*a* and 22*b* making the master cylinder 2 and wheel cylinders 6FR, 6RL, 6RR and 6FL communicate with each other for supplying the brake hydraulic pressure to the wheel cylinders 6FR, 6RL, 6RR and 6FL, a control device of a brake hydraulic pressure 12 provided at the part of the first liquid passages 22*a* and 22*b* for increasing and decreasing the brake hydraulic pressure to be supplied to the wheel cylinders 6FR, 6RL, 6RR and 6FL, and an electronic control unit 4 for outputting a command signal for operating the control device 12.

In the present embodiment, the master cylinder 2 is a tandem hydraulic pressure cylinder as shown in FIG. 1. When a driver depresses the brake pedal 1, a piston 6 is pushed into the master cylinder 2. Thereby, an operation force (or a tread force) of the brake pedal 1, the force being a physical quantity corresponding to an operation of the brake pedal 1, and/or an operation stroke of the brake pedal 1 are converted into the working hydraulic pressure of the brake.

In the present embodiment, the control device 12 is equipped with both of the ABS function and the ASR function as shown in FIG. 1. The control device 12 has a hydraulic pressure configuration that is used for realizing an ordinal ABS function and an ordinal ASR function. That is, the suction openings of oil hydraulic pumps 18a and 18b are connected to each of first reservoirs 15a and 15b for containing a brake fluid through delivery valves 17a and 17b, respectively. The pumps 18a and 18b are driven by a pump motor 19. The pump motor 19 is driven to rotate by the electronic control unit 4. The exhaust ports of the pumps 18a and 18b are connected with each of the first liquid passages 22a and 22b through delivery valves 20a and 20b, dampers 21a and 21b and restrictors 16a and 16b, respectively. These first liquid passages 22a and 22b are connected with the master cylinder 2.

The first liquid passage 22a, one of the passages 22a and 22b, communicates with the wheel cylinders 6FR and 6RL through electromagnetic inlet valves (or control valves) 23FR and 23RL and oil pressure paths 25 and 26, respectively. The other first liquid passage 22b communicates with the wheel cylinders 6RR and 6FL through electromagnetic inlet valves (or control valves) 23RR and 23FL and oil pressure paths 27 and 28, respectively.

Delivery valves 29FR, 29RL, 29RR and 29FL are connected with the electromagnetic inlet valves 23FR, 23RL, 23RR and 23FL respectively in parallel. Moreover, the oil pressure paths 25 and 26 are connected with the first reservoir 15a, one of the reservoirs 15a and 15b, through the electromagnetic outlet valves (or control valves) 24FR and 24RL, respectively. The oil pressure paths 27 and 28 communicate with the other first reservoir 15b through the electromagnetic outlet valves (or control valves) 24RR and 24FL, respectively.

That is, in the present embodiment, the control device 12 is composed of the electromagnetic inlet valves 23FR, 23RL, 23RR and 23FL, the electromagnetic outlet valves 24FR, 24RL, 24RR and 24FL, the pumps 18a and 18b, and the first reservoirs 15a and 15b as main components.

Moreover, the electric control apparatus of the present embodiment includes detecting sensors 3a and 3b of a quantity of an operation of the brake pedal 1 for detecting the operation force and/or the operation stroke of the brake pedal 1, a second reservoir 50 that is provided separately from the control device 12 in an opened state to the air and stores the brake fluid therein previously, second liquid passages 52a and 52b that make the second reservoir 50 communicate with the pumps 18a and 18b on the sides of suction openings of the pumps 18a and 18b, respectively, and are respectively provided with first on-off valves 51a and 51b, and second on-off valves 53a and 53b provided at positions of the first liquid passages 22a and 22b, respectively, the positions being nearer to the master cylinder 2 than the position of the control device 12.

Incidentally, it is needless to say that the detection sensors 3a and 3b are not to be limited to the stroke sensors shown in the FIG. 1, and a hydraulic pressure sensor or the like can be cited besides the stroke sensors. Moreover, a known reservoir equipped for the master cylinder 2 generally may be used as the second reservoir 50 also.

The second liquid passages 52a and 52b communicate with the pumps 18a and 18b on the side of their suction openings, respectively, and the communication positions are set at positions between the delivery valves 17a and 17b and the other delivery valves 59a and 59b, respectively. Moreover, reference numerals 60a and 60b in FIG. 1 severally designates a damper.

Furthermore, in the electric control apparatus of the present embodiment, third liquid passages 55a and 55b makes the second reservoir 50 communicate with the parts of the first liquid passages 22a and 22b between the second on-off valves 53a and 53b and the control device 12 through pressure relief valves 54a and 54b, respectively. Moreover, the master cylinder 2 is provided with brake simulators 56a and 56b communicating with the master cylinder 2 through fourth liquid passages 58a and 58b equipped with third on-off valves 57a and 57b, respectively.

Then, the electronic control unit 4 includes an electric control mode of a brake hydraulic pressure 40 as the operation in a normal state of the unit 4 and a mechanical control mode of a brake hydraulic pressure 41 as an operation in an abnormal state in execution of the electric control mode 40. In the electric control mode 40, the electronic control unit 4 makes the pumps 18a and 18b operate with the first on-off valves 51a and 51b being in their opened state in order that brake hydraulic pressures corresponding to signals detected by the detection sensors 3a and 3b in the state such that the second on-off valves 53a and 53b are closed are supplied to the wheel cylinders 6FR, 6RL, 6RR and 6FL. In the mechanical control mode 41, the electronic control unit 4 makes the components concerning the execution of the electric control mode 40 turn off, and the unit 4 makes the electric control apparatus supply a brake hydraulic pressure corresponding to the quantity of an operation of the brake pedal 1 in the state such that the second on-off valves 53a and 53b are opened directly to the wheel cylinders 6FR, 6RL, 6RR and 6FL.

Incidentally, a reference numeral 42 designates the other control modes such as an automatic braking mode in which the vehicle is automatically braked by a command signal from the electronic control unit 4 even if the driver of the vehicle does not operate any braking operation with the brake pedal 1, and the like.

Now, the electric control mode 40 is executed as follows. At first, a "close command signal" is transmitted from the electronic control unit 4 to the second on-off valves 53a and 53b severally, and the "close command signal" is further transmitted to the pressure relief valves 54a and 54b. An "open command signal" is transmitted to the other first on-off valves 51a and 51b and the third on-off valves 57a and 57b severally. In such a state, a brake hydraulic pressure corresponding to the quantity of an operation of the brake pedal 1 is directly supplied to the wheel cylinders 6FR, 6RL, 6RR and 6FL severally.

Or, a brake hydraulic pressure corresponding to the quantity of an operation of the brake pedal 1 is directly supplied to the wheel cylinders 6FR, 6RL, 6RR and 6FL by the repetition of "hydraulic pressure increasing operation" for operating the electric control apparatus in the state such that the first on-off valves 51a and 51b are made to be "opened"

and the pumps 18a and 18b are rotated and then the pressure relief valves 54a and 54b are made to be "closed", and "hydraulic pressure reducing operation" for operating the electric control apparatus in the state such that the pressure relief valves 54a and 54b are made to be "opened" or in addition to the setting the first on-off valves 51a and 51b are made to be "closed" and then the pumps 18a and 18b are stopped.

Moreover, the turning off of the components concerning the execution of the electric control mode 40 at the shifting of the mode of the electric control apparatus to the execution of the mechanical control mode 41 corresponds to the operation such that the electronic control unit 4 transmits an "open command signal" to the second on-off valves 53a and 53b and transmits a "close command signal" to the other first on-off valves 51a and 51b and the third on-off valves 57a and 57b. In such a state, the brake hydraulic pressure corresponding to the quantity of the operation of the brake pedal 1 is directly supplied to the wheel cylinders 6FR, 6RL, 6RR and 6FL severally.

Moreover, in the present embodiment, the electronic control unit 4 is set to keep the third on-off valves 57a and 57b in their opened state when the electric control apparatus shifts from the electric control mode 40 to the mechanical control mode 41 owing to the occurrence of an abnormal thing in the execution of the electric control mode 40 after the beginning of the operation of the brake pedal 1 (the occurrence is detected by a not shown sensor).

Thereby, the brake fluid that has been fed to the brake simulators 56a and 56b can effectively be utilized for the generation of a brake hydraulic pressure at the execution of the mechanical control mode 41 in place of the electric control mode 40.

Incidentally, in the present embodiment, the restrictors 16a and 16b and the dampers 21a and 21b, which are normally used in an ABS apparatus, may be omitted without causing no problem in the operation and advantages of the embodiment. Moreover, the dampers 60a and 60b, which is newly provided in the present embodiment, may also be omitted without causing any problems.

Next, the operation of the electric control apparatus according to the aforesaid embodiment is described. The present embodiment employs the following features: the second reservoir 50, in which a brake fluid is previously stored, is provided besides the control device 12; the second reservoir 50 communicates with the pumps 18a and 18b, which are the original components of the control device 12, on the side of the suction openings of the pumps 18a and 18b through the second liquid passages 52a and 52b equipped with the first on-off valves 51a and 51b, respectively; and the second on-off valves 53a and 53b are respectively provided at the positions of the first liquid passages 22a and 22b nearer to the master cylinder 2 than the position of the control device 12. Thereby, the present embodiment can construct the electric control mode 40 of the electronic control unit 4 to operate the pumps 18a and 18b in the state in which the first on-off valves 51a and 51b are opened in order to supply a brake hydraulic pressure corresponding to a signal detected by the detection sensors 3a and 3b in the state such that the second on-off valves 53a and 53b are closed and the third on-off valves 57a and 57b are opened to the wheel cylinders 6FR, 6RL, 6RR and 6FL severally. Consequently, because the embodiment is newly provided with only the second reservoir 50 and uses the existing pumps 18a and 18b also as hydraulic pressure generating means in the electric control mode 40, the embodiment can construct the electric control system having a simple configuration without increasing the number of the parts thereof so much.

Furthermore, when an abnormality occurs at the execution of the electric control mode 40, namely when the occurrence of an abnormality is detected by a not shown abnormality detecting sensor or the like, the present embodiment turns off the components concerning the execution of the electric control mode 40, and the embodiment shifts its control mode to the mechanical control mode 41, in which the brake hydraulic pressure corresponding to the quantity of an operation of the brake pedal 1 in the state such that the second on-off valves 53a and 53b are opened is directly supplied to the wheel cylinders 6FR, 6RL, 6RR and 6FL severally, in place of the execution of the electric control mode 40. Thereby the fail-safe function can simply and surely be realized.

Moreover, if high hydraulic pressurization by the pumps 18a and 18b becomes excessive during the execution of the electric control mode 40, the pressure relief valves 54a and 54b are opened to return the brake fluid to the second reservoir 50 through the third liquid passages 55a and 55b automatically. Consequently, the safety of the electric control apparatus is further improved.

Moreover, the following operation and the advantages are obtained by an electric control apparatus constructed to transmit a brake light signal from a brake light signal outputting part 11 to the electronic control unit 4 when the brake pedal 1 is operated so that the unit 4 executes the electric control mode 40 after the normal operation of the brake pedal 1 has been confirmed by receiving the transmission of the brake light signal.

A braking force can be generated accurately correspondingly to a brake operation of a driver, and the possibility of an erroneous action owing to the careless execution of the electric control mode 40 can be decreased. Incidentally, in the case where the electric control apparatus is equipped with the automatic braking mode such that, when the driver is not performing any braking operation with the brake pedal 1, the electric control apparatus executes the automatic braking of the vehicle in response to a command signal from the electronic control unit 4, the electric control apparatus does not employ the construction for executing the electric control mode 40 based on the brake light signal. Moreover, it is preferable to set the electric control apparatus to shift to the mechanical control mode 41 when either of the brake light signal of the brake light signal outputting part 11 and a signal detected by the detection sensors 3a and 3b is judged to be "abnormal".

Moreover, because the present embodiment can construct the electric control mode 40 by the use of the pumps 18a and 18b, as they are, which are necessarily furnished by the existing control device 12 equipped with the ABS function and the ASR function, the increase of the number of the parts of the electric control apparatus can be prevented. Moreover, the ABS function and the ASR function can be brought into their full play as they are. Moreover, because the electric control apparatus installs the ABS apparatus therein, the electric control apparatus can realize an electronic stability program (ESP) function by using the part of the control device 12 for the ABS function.

Furthermore, in the electric control apparatus installing the automatic braking mode therein, the electronic control unit 4 is constructed to make the control device 12 operate independently from the strokes of the brake pedal 1. Thereby, the vehicle can automatically be braked in the automatic braking mode even when the driver does not perform any braking operations with the brake pedal 1 in such cases as, for example, a case of braking the driving wheels thereof to prevent the slip of the driving wheels by driving slip preventing control when the driving wheels have slipped, a case of braking by yawing moment control for generating a yawing moment in the direction in which an excessive oversteering state or an excessive understeering state of the vehicle is suppressed when the vehicle takes the excessive oversteering state or the excessive understeering state, a case of the operation of the ESP, or the like.

Figure 2:
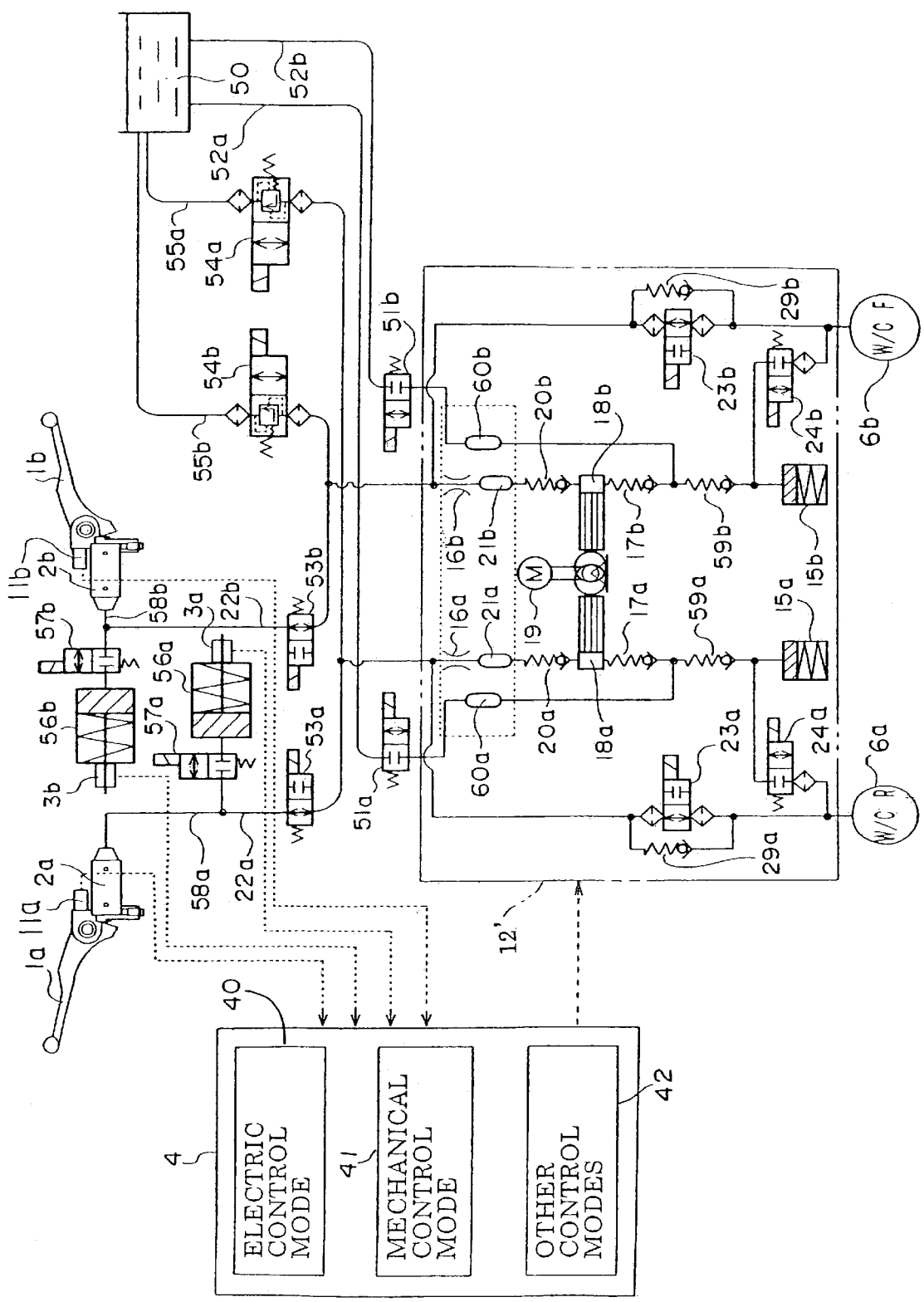
FIG. 2 is a schematic diagram showing the configuration of an electric control apparatus of a brake provided with the ABS function and the ASR function according to another embodiment of the present invention as an example of being applied to a motorcycle.

FIG. 2 shows an example in which the present invention is applied to a motorcycle. Because the second embodiment of the present invention does not basically differ from the first embodiment shown in FIG. 1 except that the second embodiment has a pair of brake levers 1a and 1b on the left side and the right side, respectively, in place of the brake pedal 1 and a pair of brake light signal outputting parts 11a and 11b on the left side and the right side, respectively, in place of the brake light signal outputting part 11, and further two systems of liquid passages corresponding to two wheel cylinders 6a and 6b for the motorcycle in the control device 12', the same components of the second embodiment as those of the first embodiment are designated by the same reference marks as those shown in FIG. 1, and their descriptions are omitted. Incidentally, in FIG. 2, each component on the left side and the right side corresponding to each other are designated by the same reference numerals with suffixes of "a" and "b". That is, reference numerals are used to be in common in FIG. 1 and FIG. 2. For example, reference marks "2a" and "2b" designate each master cylinder on the left side and on the right side, respectively.

Moreover, in the motorcycle also, a known reservoir (not shown) equipped ordinarily in the master cylinders 2a and 2b can also be used as the second reservoir 50. In this case, the second liquid passage 52a and the third liquid passage 55a on one side are connected with the reservoir 15a of the master cylinder 2a for a rear wheel, and the second liquid passage 52b and the third liquid passage 55b on the other side are connected with the reservoir 15b of the master cylinder 2b for a front wheel.

The motorcycle equipped with the electric control apparatus can easily realize a braking operation interlocking for the front wheel and the rear wheel. For example, the braking operation interlocking for the front wheel and the rear wheel can be realized by a configuration such that, when an operation of the brake lever 1a is detected by the detection sensor 3a on one side, a corresponding signal is transmitted to the detection sensor 3b of the brake lever 1b on the other side. Moreover, it is also possible to set such that the braking operation interlocking for the front wheel and the rear wheel is performed only when either of the brake levers 1a and 1b is operated, and that, when the other lever of the brake levers 1a and 1b is operated, only the brake in the operated system operates. In this case, the distribution of the braking force of the front wheel and the braking force of the rear wheel at the time of the braking operation interlocking for the front wheel and the rear wheel can freely be set by means of software.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An electric control apparatus of a brake comprising:
   a master cylinder for generating a brake hydraulic pressure according to an operation of a brake pedal;
   a first liquid passage for supplying the brake hydraulic pressure to a wheel cylinder by making said master cylinder and the wheel cylinder communicate with each other;
   a control device of the brake hydraulic pressure provided at a part of said first liquid passage, said control device including a control valve, a pump and a first reservoir containing a brake fluid as main components, said control device increasing and decreasing the brake hydraulic pressure to be supplied to the wheel cylinder by controlling operations of the components;
   detection means of a quantity of the operation of the brake pedal for detecting a physical quantity corresponding to the operation of the brake pedal;
   a second reservoir provided separately from said control device, said second reservoir storing the brake fluid in advance, said second reservoir further communicating with a part in the first liquid passage between a second on-off valve and said control device through a pressure relief valve by a third liquid passage;
   a second liquid passage making said second reservoir communicate with the pump, which is one component of said control device, on a side of a suction opening of the pump, said second liquid passage being provided with a first on-off valve;
   said second on-off valve provided at a position in said first liquid passage, the position being nearer to the master cylinder than a position of said control device; and
   an electronic control unit for outputting a command signal for operating said control device, said electronic control unit including an electric control mode of the brake hydraulic pressure as an operation in a normal state of said unit and a mechanical control mode of the brake hydraulic pressure as an operation in an abnormal state in execution of said electric control mode, the electric control mode being for operating the pump with said electric control mode the electric control mode being for operating the pump with said first on-off valve being opened in order to supply a brake hydraulic pressure to the wheel cylinder, the brake hydraulic pressure being corresponding to a detection signal of said detection means in a state such that said second on-off valve is closed, said mechanical control mode being for supplying a brake hydraulic pressure to the wheel cylinder directly, the brake hydraulic pressure corresponding to the quantity of the operation of the brake pedal in a state such that said second on-off valve is opened after turning off components concerning the execution of said electric control mode.

2. The electric control apparatus according to claim 1, said apparatus further comprising a brake simulator communicating with said master cylinder through a fourth liquid passage with a third on-off valve,
   wherein said electronic control unit is set to keep said third on-off valve in an opened state thereof when said unit shifts to the mechanical control mode in a case where an abnormality is generated in execution of the electric control mode after a beginning of an operation of the brake pedal in the electric control mode.

3. The electric control apparatus according to claim 1, said apparatus further comprising a brake light signal outputting part provided in the brake pedal, said brake light signal outputting part being connected with said electronic control unit to transmit a brake light signal to said unit when the brake pedal is operated, wherein said unit executes said electric control mode after confirming that the brake pedal has normally operated by transmission of the brake light signal.

4. The electric control apparatus according to claim 1, said apparatus further comprising a brake light signal outputting part provided on the brake pedal, said brake light signal outputting part being connected with said electronic control unit to transmit a brake light signal to said unit when the brake pedal is operated, wherein said detection means is connected with said electronic control unit to transmit the detection signal of said detection means to said electronic control unit when the brake pedal is operated, and said electronic control unit executes said mechanical control mode when either of both the signals is abnormal.

5. The electric control apparatus according to claim 1, wherein said control device includes an anti-lock braking system function and a traction control system function.

* * * * *